United States Patent
Xing et al.

(10) Patent No.: US 7,682,656 B2
(45) Date of Patent: Mar. 23, 2010

(54) PROCESS AND APPARATUS FOR PRODUCING A COATED PRODUCT

(75) Inventors: Baozhong Xing, Calgary (CA); J. David Eastham, Okotoks (CA); Nick P. Wynnyk, Edmonton (CA)

(73) Assignee: Agruim Inc., Calgary, Alberta (CA)

( * ) Notice: Subject to any disclaimer, the term of this patent is extended or adjusted under 35 U.S.C. 154(b) by 1203 days.

(21) Appl. No.: 10/868,646

(22) Filed: Jun. 14, 2004

(65) Prior Publication Data

US 2005/0276905 A1  Dec. 15, 2005

(51) Int. Cl.
  *B05D 7/00* (2006.01)
(52) U.S. Cl. ........................ 427/242; 118/418
(58) Field of Classification Search ................. 427/242; 118/418
  See application file for complete search history.

(56) References Cited

U.S. PATENT DOCUMENTS

| | | | |
|---|---|---|---|
| 2,576,952 A | 12/1951 | Lowe et al. | |
| 3,285,223 A * | 11/1966 | Sahlin | 118/64 |
| 3,903,333 A | 9/1975 | Shirley, Jr. et al. | 427/212 |
| 3,953,192 A | 4/1976 | Hodgson et al. | 71/59 |
| 3,991,225 A | 11/1976 | Blouin | |
| 4,023,955 A | 5/1977 | Mueller | 71/64 F |
| 4,042,366 A | 8/1977 | Fersch et al. | 71/29 |
| 4,142,885 A | 3/1979 | Heumann et al. | 71/28 |
| 4,150,965 A | 4/1979 | Van Hijfte et al. | 71/27 |
| 4,220,463 A | 9/1980 | Van Hijfte et al. | 71/27 |
| 4,241,692 A * | 12/1980 | Van Hijfte et al. | 118/303 |
| 4,363,285 A | 12/1982 | Yoshida et al. | |
| 4,444,810 A | 4/1984 | Huttlin | |
| 4,465,017 A * | 8/1984 | Simmons | 118/418 |
| 4,711,659 A | 12/1987 | Moore | 71/93 |
| 4,725,446 A | 2/1988 | Forster et al. | |
| 4,804,403 A | 2/1989 | Moore | 71/28 |
| 4,857,098 A | 8/1989 | Shirley, Jr. | 71/28 |
| 4,857,359 A | 8/1989 | Groher et al. | |
| 4,969,947 A | 11/1990 | Moore | 71/28 |
| 5,089,041 A | 2/1992 | Thompson et al. | 71/64.11 |
| 5,186,732 A | 2/1993 | Thompson et al. | 71/64.11 |
| 5,188,654 A | 2/1993 | Manalastas et al. | 71/28 |
| 5,219,465 A | 6/1993 | Goertz et al. | 71/28 |

(Continued)

FOREIGN PATENT DOCUMENTS

CA   1171326   7/1984

(Continued)

OTHER PUBLICATIONS

International Search Report from PCT/CA2005/001814 which is a corresponding international application of co-pending related U.S. Appl. No. 11/292,048.

(Continued)

*Primary Examiner*—Erma Cameron
(74) *Attorney, Agent, or Firm*—Faegre & Benson LLP

(57) ABSTRACT

The present invention relates to a process for producing a coated product comprising: (a) coating a substrate with a coating material to form a coated substrate; and (b) stabilizing the coated substrate to form the coated product; wherein the operating parameter of substrate-substrate contact and coated substrate-coated substrate contact differs between step a) and step b), such that in step b) the contact is minimized. An apparatus is also provided.

25 Claims, 3 Drawing Sheets

U.S. PATENT DOCUMENTS

| | | | |
|---|---|---|---|
| 5,238,480 A | 8/1993 | Rehberg et al. ................ 71/28 |
| 5,256,181 A | 10/1993 | Manalastas et al. ............ 71/27 |
| 5,300,135 A | 4/1994 | Hudson et al. ................. 71/28 |
| 5,374,292 A | 12/1994 | Detrick et al. | |
| 5,405,426 A | 4/1995 | Timmons et al. ............... 71/28 |
| 5,435,821 A | 7/1995 | Duvdevani et al. ............. 71/28 |
| 5,466,274 A | 11/1995 | Hudson et al. ................. 71/28 |
| 5,478,375 A | 12/1995 | Hudson .......................... 71/28 |
| 5,501,874 A | 3/1996 | Yamamoto et al. | |
| 5,538,531 A | 7/1996 | Hudson et al. ................. 71/28 |
| 5,547,486 A | 8/1996 | Detrick et al. | |
| 5,601,873 A | 2/1997 | Nakazawa et al. | |
| 5,622,561 A | 4/1997 | Cummins et al. | |
| 5,637,349 A | 6/1997 | Cummins et al. | |
| 5,653,782 A | 8/1997 | Stern et al. ..................... 71/53 |
| 5,698,002 A | 12/1997 | Hudson .......................... 71/28 |
| 5,803,946 A | 9/1998 | Petcavich et al. | |
| 5,851,261 A | 12/1998 | Markusch et al. ......... 71/64.07 |
| 5,858,094 A * | 1/1999 | Detrick et al. .............. 118/303 |
| 5,917,110 A | 6/1999 | Kust ............................... 71/27 |
| 5,984,994 A | 11/1999 | Hudson .......................... 71/28 |
| 5,997,601 A | 12/1999 | Kust ............................... 71/27 |
| 6,001,147 A | 12/1999 | Markusch et al. | |
| 6,152,981 A | 11/2000 | Markusch et al. | |
| 6,165,550 A | 12/2000 | Markusch et al. | |
| 6,176,891 B1 | 1/2001 | Komoriya et al. | |
| 6,231,633 B1 | 5/2001 | Hirano et al. | |
| 6,315,807 B1 | 11/2001 | Patra et al. | |
| 6,322,606 B1 | 11/2001 | Komoriya et al. | |
| 6,336,949 B1 | 1/2002 | Patra et al. | |
| 6,338,746 B1 | 1/2002 | Detrick et al. ................. 71/28 |
| 6,355,083 B1 | 3/2002 | Ogzewalla | |
| 6,358,295 B1 | 3/2002 | Tabei et al. ................ 71/64.02 |
| 6,358,296 B1 | 3/2002 | Markusch et al. ......... 71/64.07 |
| 6,361,720 B1 | 3/2002 | Highsmith | |
| 6,364,925 B1 | 4/2002 | Markusch et al. ......... 71/64.07 |
| 6,391,454 B1 | 5/2002 | Mao et al. | |
| 6,436,164 B1 | 8/2002 | Highsmith | |
| 6,475,259 B1 | 11/2002 | Thomas et al. ............. 71/64.07 |
| 6,503,288 B1 | 1/2003 | Markusch .................. 71/64.07 |
| 6,537,611 B1 | 3/2003 | Detrick et al. | |
| 6,663,686 B1 | 12/2003 | Geiger et al. .................. 71/28 |
| 6,787,234 B2 | 9/2004 | Tijsma et al. | |
| 2002/0056948 A1 | 5/2002 | Highsmith | |
| 2003/0033843 A1 | 2/2003 | Tabei | |
| 2003/0051523 A1 | 3/2003 | Tabei | |
| 2003/0089150 A1 | 5/2003 | Markusch et al. ................ 71/1 |
| 2004/0016276 A1 | 1/2004 | Wynnyk et al. ............ 71/64.11 |
| 2004/0020254 A1 | 2/2004 | Wynnyk et al. ............ 71/64.11 |
| 2004/0045331 A1 | 3/2004 | Geiger et al. | |
| 2005/0076687 A1 | 4/2005 | Whittington | |

FOREIGN PATENT DOCUMENTS

| | | |
|---|---|---|
| CA | 2 402 212 | 9/2001 |
| EP | 0 60944481 | 4/1998 |
| GB | 1453258 | 10/1976 |
| GB | 1482213 | 8/1977 |
| JP | 8-183828 | 7/1996 |
| WO | WO 03/048075 | 6/2003 |

OTHER PUBLICATIONS

International Search Report from corresponding application PCT/CA2005/000906.

Wall, Larry L. and Gehrke, Charles W. *Automated Determination of Urea and Ammoniacal Nitrogen (NPN) in Animal Feeds* (Missouri, University of Missouri: 1980).

* cited by examiner

PROCESS AND APPARATUS FOR PRODUCING A COATED PRODUCT

FIELD

The present invention relates to a process and apparatus for preparing a thin, substantially uniform coating on a product, preferably a controlled release product, preferably a fertilizer.

BACKGROUND

Fertilizers have been used for many years to supplement nutrients in growing media.

In recent years the fertilizer arts have focused on techniques to deliver controlled amounts of plant nutrients to soil or other growing media. The goals of controlled release of fertilizer are (1) to ensure that growing plants are not adversely deprived of nutrients, and (2) to ensure that an over supply of nutrients is avoided. An over supply of nutrients can result in toxicity to plants or losses from leaching. Controlled release of fertilizers provides an improvement in fertilizer use efficiency and can reduce the rate and the frequency of nutrient application.

A controlled release product that has a low coating weight or thin coating is desirable to save manufacturing costs, since less coating is required. In order to have a good slow release profile however the coating must be substantially uniform. This is difficult to achieve in a thin coating, because during conventional coating processes the coating is often damaged or its integrity impaired.

It has surprisingly been found that if the coating process is separated into two steps, an application step and a stabilization step, where different operating parameters (i.e., mechanical handling of substrate and coated substrate) are used for each step, a controlled release product can be made having a low coating weight and a good slow release profile.

A single operating parameter between the application and stabilization steps of latex on a fertilizer is described in U.S. Pat. Nos. 5,089,041 and 5,186,732, where a single fluidized bed is used for both steps. A similar process is described in U.S. Pat. Nos. 5,188,654, 5,256,181 and 5,435,821 for the application of polymer to a fertilizer.

In a series of patents by Moore (U.S. Pat. Nos. 4,711,659, 4,804,403 and 4,969,947) a polymer topcoat is created by applying to a fertilizer a first layer, which chemically bonds to the fertilizer, and a second layer, which chemically bonds to the first layer. While a rapidly rotating drum is described in the Examples for the application step, a change of operating parameter is not described for the stabilization step.

A process for coating a fertilizer with polymer is also described in U.S. Pat. No. 6,358,295. The tumbling motion described for the application step is apparently maintained for the stabilization step.

It has also been suggested that where a polymer coating is applied, fertilizer particles are to be kept in low shear, low impact, motion relative to each other during the coating process (i.e., gentle mixing): U.S. Pat. Nos. 5,538,531, 5,851,261, 5,698,002, 6,358,296, 6,364,925 and 6,503,288.

Composite coatings comprising a polymer and an additive/filler have also been described in U.S. Pat. No. 6,663,686, US 2004/0020254 and US 2004/0016276, but only a single operating parameter is described in the patent and publications.

In addition to polymer coatings, other fertilizer coatings have also been used, such as a cement only or cement/elastomer coating (U.S. Pat. No. 4,023,955); an amine or amine blend with a microcrystalline wax, paraffin or synthetic wax (U.S. Pat. No. 6,475,259); an alkylamine mineral oil combination (U.S. Pat. Nos. 4,150,965 and 4,220,463); and a urea-lignosulfonate binder (U.S. Pat. No. 5,238,480). In these cases as well, different operating parameters have not been described for the application and stabilization steps.

A nitrogen based coating material for calcium has also been described in U.S. Pat. Nos. 5,997,601 and 5,917,110. A change in operating parameters between the application and stabilization steps is not described in these patents. In these patents the problem of agglomeration of coated particles is avoided by application of a conditioning agent.

The patent literature also describes coating a fertilizer with sulphur alone or in combination with a polymer or another coating material. There are inherent problems in coating a fertilizer with sulphur. In sulphur-only coated fertilizers, specific processing parameters must be used to avoid undesirable forms of sulfur, which crack, resulting in loss of controlled release properties (see for instance U.S. Pat. Nos. 3,903,333 or 5,405,426). Pre-treatment of fertilizer may be required to avoid these problems: U.S. Pat. Nos. 3,903,333 and 5,563,782. Temperature control throughout the coating process is also a key factor (U.S. Pat. No. 3,903,333).

Controlled release properties of sulfur coated fertilizers may also be improved by utilizing a polymer topcoat as in the case of U.S. Pat. Nos. 5,219,465, 5,405,426 and 5,466,274. Wax based sealants have also been employed (U.S. Pat. Nos. 4,042,366, 5,300,135, 5,466,274, 5,478,375 and 5,984,994). Attempts to improve the controlled release properties of sulfur-coated fertilizers have also been made by mechanically interweaving the sulfur and fertilizer (U.S. Pat. No. 4,857,098). Polymer-sulfur-polymer coated fertilizers have also been employed (U.S. Pat. No. 6,338,746).

SUMMARY

In a first broad aspect of the invention, there is provided a process for substantially uniformly coating a substrate, wherein the substrate is substantially free of surface defects.

In a further broad aspect of the invention, the two-step process of the invention increases productivity through the optimization of operating parameters between the application and stabilization steps.

Accordingly, in a further aspect of the invention, there is provided a process for producing a coated product comprising: (a) coating a substrate with a coating material to form a coated substrate; and (b) stabilizing the coated substrate to form the coated product; wherein the operating parameter of substrate-substrate contact and coated substrate-coated substrate contact differs between step a) and step b), such that in step b) the contact is minimized.

In another aspect of the invention, there is provided a fertilizer product produced using the process of the invention.

In yet another aspect of the invention, there is provided an apparatus for producing a coated product comprising: (a) means for coating a substrate with a coating material to form a coated substrate; (b) means for stabilizing the coated substrate to form the coated product; and (c) means for providing different operating parameters for coating the substrate and stabilizing the coated substrate, whereby the means for stabilizing minimizes contact between coated substrate particles.

DETAILED DESCRIPTION

Figure 1:
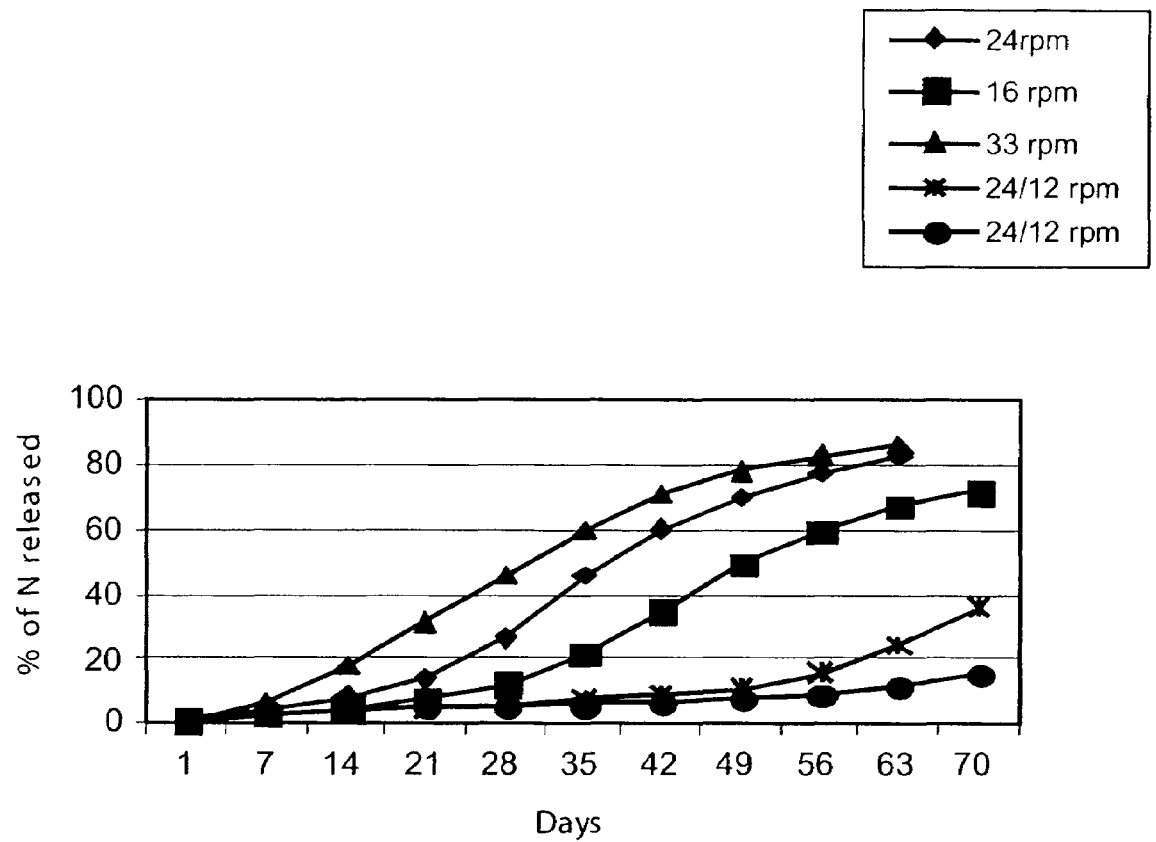
FIG. 1 is a controlled release profile showing the effect of drum RPM on release rate.

The process of the invention may be applied to a variety of substrates, with fertilizer or plant nutrient materials being preferred. However, other examples of substrates include drugs, vitamins, etc.—any substrate for which a thin, substantially uniform coating (e.g., controlled release) would be beneficial.

If a fertilizer or plant nutrient material is coated, the fertilizer or plant nutrient material preferably comprises a water soluble compound. Preferably, the plant nutrient comprises a compound containing nitrogen, phosphorus, potassium, sulphur, micronutrients, or a mixture thereof. A preferred plant nutrient comprises urea. Other examples of useful plant nutrients are ammonium sulphate, ammonium phosphate and mixtures thereof. Examples of useful micronutrients include copper, zinc, boron, manganese, iron and mixtures thereof. Useful plant nutrient materials are also described in U.S. Pat. Nos. 5,538,531 and 6,358,296.

A variety of coatings may be used on a substrate. Preferably, a polymer coating is used, and more preferably a thermoset polymer. Examples of thermoset polymers include those derived from phenolic, aminoplastic or epoxy resins, some polyesters, polysulphides, and polyurethanes. The thermoset polymer is preferably derived from an epoxy resin. Yet more preferably, the thermoset polymer is a polyurethane or a substituted polyurethane.

In a preferred embodiment, the thermoset polymer is formed by reacting a polyol or a mixture of polyols and an isocyanate or a mixture of isocyanates. The polyol may be any hydroxy-terminated polyol, such as a polyether, polyester, polycarbonate, polydiene, polycaprolactone, or a mixture thereof. Preferred are polyols such as hydroxy-terminated polyhydrocarbons, hydroxy-terminated polyformals, fatty acid triglycerides, hydroxy-terminated polyesters, hydroxymethyl-terminated polyesters, hydroxymethyl-terminated perfluoromethylenes, polyalkylene-ether glycols, polyalkylene-arylene-ether glycols and polyalkylene-ether triols. Preferred polyols include polyethelene glycols, adipic acid-ethylene glycol polyesters, poly(butylene glycol), poly (propylene glycol) and hydroxy-terminated polybutadiene (see, for example, British patent No. 1,482,213). The most preferred are polyether polyols and more preferred are polyether polyols having a molecular weight in the range of from about 60 to about 20,000, more preferably from about 60 to about 10,000 and most preferably from about 60 to about 8,000.

Preferred polyols are also described in U.S. Pat. No. 5,538,531. In U.S. Pat. No. 5,538,531, polyols having from about 2 to about 6 hydroxy groups, and preferably having at least one $C_{10}$-$C_{22}$ aliphatic moiety, are described.

Most preferably, the polyol is castor oil.

The polyol may also be derived from natural sources, such as soybean, corn, canola, and the like. Polyols derived from natural sources can be used as they are or can be used to derive a synthetic polyol, such as a synthetic polyol based on soybean oil, which is commercially available from Urethane Soy Systems Corp. (Princeton, Ill.).

Another useful class of polyols are oleo polyols, such as described in U.S. Pat. No. 6,358,296.

A mixture of polyols may also be used, for instance, castor oil with ethylene glycol, castor oil with oleo polyol, castor oil with polyethylene glycol, castor oil with polyporopylene glycol, or a polypropylene (or polyethylene) glycol mixture of different end groups and molecular weight.

Any suitable isocyanate may also be used. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover Q may be represented by the formula:

$$Q^1-Z-Q^1$$

wherein $Q^1$ is an alkylene or arylene group and Z is chosen from the group comprising —O—, —O—$Q^1$—, CO—, —S—, —S—$Q^1$—S— and —$SO_2$—. Examples of isocyanate compounds which fall within the scope of this definition include hexamethylene diisocyanate, 1,8-diisocyanato-p-naphthalene, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4, 4'4"-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as described above) with an active hydrogen-containing compound, preferably the polyols described above. In this embodiment, the polyisocyanate may be, for example, used in proportions of from about 30 percent to about 200 percent stoichiometric excess with respect to the proportion of hydroxyl in the polyol.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical. Such isocyanates may be used together with compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also, for example, British patent No. 1,453,258 for other examples of useful isocyanate compounds.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polisocyanates and mixtures thereof.

Particularly preferred isocyanates are those described in U.S. Pat. Nos. 5,538,531 and 6,358,296.

An isocyanate mixture may be preferred for some coatings.

Preferably, the polyol and isocyanate are used in amounts such that the ratio of NCO groups in the isocyanate to hydroxy groups in the polyol is in the range from about 0.5 to about 3.0, more preferably from about 0.8 to about 2.0, and most preferably from about 0.9 to about 1.1.

In addition, a thermoset polymer may be formed by using amine group-terminated or mercaptan-terminated monomers. For instance a urea-formaldehyde resin may be used.

Additives may be included in the coating materials. For instance, if the coating materials are hydrophilic, then they will be compatible with hydrophilic substrate surfaces and they will be easy to spread on the surface. If the coating materials are hydrophobic however, there will be difficulty in spreading the coating materials on the substrate surface. Under these circumstances, additives like wetting agents, flow agents, levelling agents and coupling agents may be used to improve spreadability. If the viscosity of the coating is high, an additive may be also be used to improve spreadability.

Another function of additives is to increase the hydrophobicity of the coating. Hydrophobic additives reduce the release rate of coated substrate.

Preferred additives are organic additives, such as petroleum products, coal products, natural products and synthetic products. Lubricants derived from these may also be used. Exemplary organic additives include commercially available coating additives and paint additives (such as wetting agents, flow agents, levelling agents and coupling agents), wax, paraffin oil, bitumen, asphalt, oil derived from coal, canola oil, soybean oil, coconut oil, linseed oil, tung oil, vegetable wax, animal fat, animal wax, and forest products such as tall oil, modified tall oil, tall oil pitch, and pine tar. Mixtures of these materials may also be used. Particularly preferred organic additives are hydrophobic materials.

If the organic additive is wax, preferred waxes are those described in U.S. Pat. No. 5,538,531 or a silicone wax, such as is available from Dow Corning. Preferred waxes have a drop melting point of at least 10° C., preferably between about 20° C. to about 120° C., and more preferably between about 30° C. to about 120° C. Most preferably, the wax is substantially non-tacky below about 40° C. The preferred wax is a $C_{10}+$ alpha-olefin, and more preferably a $C_{20-100}$ alpha-olefin. Most preferably, the wax is a $C_{30}+$ wax, such as is available commercially from Chevron Phillips Chemical Company.

The amount of organic additive may vary, depending on its purpose in the mixture. For instance, for some commercially available additives, an amount as low as 0.001% by weight of the coating composition may be used.

Preferred organic additives and amounts are those that improve the release profile and mechanical handling of the polymer coated substrate.

The process of the invention comprises a first application step in which a coating is uniformly applied to a substrate, followed by a second stabilization step in which contact between, or relative movement of, coated particles is minimized. In each of these steps, the operating parameters are different, preferably substantially different.

The application step followed by the stabilization step can be repeated as many times as needed or desired to coat the substrate.

It is worthwhile noting that the substrate need not be spherical and non-spherical substrates need not be removed prior to coating. The present process can be used to coat the entire substrate stream as it is produced in a granulator or the like.

Preferably, the application step is conducted in a rotating drum, screw blender or in a fluidized bed. Where a rotating drum is used, the severity of the tumbling, mixing or rotating of the substrate can be controlled by the drum rotating rate (e.g., RPM), by increasing or decreasing the diameter of the drum, by mechanical means, such as by adding a rotating mixer, baffles or plowshares, or by combinations thereof. These and other methods for controlling the rate of rotation of a substrate in a rotating drum are known to a person skilled in the art.

Where a rotating drum is used for the application step, a severe or rapid tumbling, mixing or rotating of the particles is desirable; such as is achieved by a fast drum speed. A preferred drum speed is greater than about 15 rpm, preferably, between about 15 to about 40 rpm, more preferably between about 20 to about 30 rpm, and more preferably still about 24 rpm, for a drum having a diameter of about 1 foot.

Where a rotating drum is used, particle motion inside the drum may be described by average linear velocity. The average linear velocity ($v_{ave}$) of a particle moving at the circumference of a rotating drum may be expressed by the following formula:

$$v_{ave} = 2\pi(r/t)$$

wherein r is the radius of the drum and t is the time for one rotation of the drum.

Thus, by increasing the radius of the drum, the average linear velocity of the particles may be increased.

The average linear velocity may also be increased by increasing drum RPM.

In the application step, a high linear velocity is desirable.

A preferred drum speed in terms of circumference is greater than about 14 mpm (meter per minute), preferably, between about 14 to about 40 mpm, more preferably between about 20 to about 30 mpm, and more preferably still about 24 mpm.

The above formula for $v_{ave}$, however, only holds true, where the interior surface of the drum is smooth. Where the drum includes baffles, the particle motion is influenced by the baffle structure. The preferred drum speeds mentioned above will therefore change with structural changes to the drum in order to achieve optimium mixing results and spreading results of the coating materials on the substrate granules.

Where a fluid bed is used for the application step, the rate of agitation can be controlled by air flow rate. Fluidization is used to describe the state of the bed between a fixed bed and a pneumatic bed. In a fixed bed, the upward air flow rate is small and particles are in direct contact with each other. In a pneumatic bed, the upward air flow rate is large and particles may be transported out of the fluidization vessel. In a fluidized bed, depending on the gas velocity, the bed may be in a minimum fluidization state, a smooth fluidization state, a bubbling state, a slugging state, a turbulent state or a fast fluidized state. For the application step, a bubbling state, a slugging state, a turbulent state or a fast fluidized state may be used to achieve good mixing results and spreading results of the coating materials on the substrate granules. The operating parameters for the fluid bed during the application step are determined by the shape and size of the vessel, the size of the substrate, and the characteristics of the coating material. The optimum operating parameters can be chosen according to the ordinary skill of a person skilled in the art.

The duration of the application step will depend upon a number of factors, including the change in viscosity of the coating material. During the polymerization process for a thermoset polymer, the viscosity of the coating material will increase with the polymerization degree, which is related to time. When the viscosity reaches a certain value, the application step should be ceased and the stabilization step begun. If the viscosity of the coating raw materials is low and the increase in viscosity over time is slow, then a longer application step and a less vigorous agitation is preferred than when the viscosity of the coating raw materials is high and the increase in viscosity over time is fast.

Temperature also plays an important role in the change in viscosity. The higher the temperature, the faster the viscosity will increase, and consequently, a shorter coating time and a more vigorous agitation will be required to achieve a uniformly coated substrate substantially free of surface defects.

In any event, where the agitation or mixing is powerful, the application step will be of a shorter duration. If strong agitation is provided, a higher coating temperature can be used and the time for the application step decreased. A shorter coating time will increase productivity.

In order to achieve a uniform coating, substantially free of surface defects, (1) the duration of the application step, (2) the viscosity of the coating material, (3) the degree of agitation or mixing, and (4) the temperature of the application step are optimized according to the above considerations.

The optimum combination of these parameters is strongly dependent upon the nature of the coating materials and the equipment used for the coating process. The optimum combination of these parameters can be determined through routine experimentation.

When a polyol and isocyanate are used for a coating, the application step will generally take about 2 minutes in a rotating drum having a diameter of about 1 foot, rotating at about 24 rpm and held at a temperature of about 75° C.

Where a polymer is used as the coating material, the monomers may be contacted sequentially or simultaneously with the surface of the substrate. If the monomers are contacted with the substrate surface simultaneously, typically a polymer pre-mix is used, where the monomers are partially reacted before application, or a prepolymer is used as described above. If any further additives, such as organic additives are used, these may be premixed with one or more of the monomers or the prepolymer or the pre-mix or may be applied sequentially to the substrate surface in any order with the monomers, prepolymer or pre-mix. Where a rotating drum is used for the application step, the polymeric or monomeric mixtures can be introduced into the drum by any means, such as by spraying or by dribbling onto the surface of the particles or into the substrate bed. Where a fluidized bed is used, a hose may be dipped into the granule bed to spray the coating material onto the surface of the substrate when the substrate granules are moving in the bed.

Once the coating has been applied and a uniform coating is achieved, the stabilization step is performed. For the stabilization step, contact between the coated particles is minimized. Contact between the coated particles is minimized to avoid the coating being torn off of the coated substrate and/or caves or depressions forming on the coating that may result in an uneven coating thickness.

Where a polymer is used as the coating, the stabilization step is the polymer curing stage for thermoset polymers and the drying stage for thermoplastic polymers. During the curing stage for thermoset polymers, the viscosity of the polymer increases significantly, and the polymer becomes thick. When the viscosity reaches a certain value, the coating materials will become tacky. The period of time measured from the beginning of the polymerization reaction to this "tacky" stage is called the "gel time". Using traditional coating processes, during curing, especially during the gel time, the coated fertilizer granules come into contact resulting in granules caking together and defects (such as an uneven coating thickness, craters, tears, pinholes, etc.) forming on the coating surface. To prevent these defects, contact between the coated particles should be minimized during the stabilization step.

Drying of thermoplastic polymers can be achieved by solvent evaporation. Contact between the coated particles should also be minimized during the drying stage to minimize coating defects.

The stabilization step can be conducted in any apparatus which achieves the result of minimizing contact between coated particles, including, but not limited to, a rotating drum, a screw blender or a fluidized bed. If a rotating drum is used, without baffles, etc., the drum speed should be slow, preferably about 10% to about 80% that of the application step, more preferably about 20% to about 80%, even more preferably about 30% to about 80%, and still more preferably about 40% to about 80%. If a drum having a diameter of about 1 foot were to be used, preferably, the drum speed would be less than about 15 rpm, more preferably between about 1 to about 15 rpm, more preferably still between about 2 to about 12 rpm, and even more preferably still about 3 to about 12 rpm. By decreasing drum size (e.g., by about 10% to about 80% of the size of the drum in the application step), the average linear velocity of the particles will also decrease, minimizing contact between coated particles. The tumbling, mixing or rotating of the particles can also be controlled by mechanical means, such as baffle structure.

Where a fluidized bed is used for the stabilization step, fluidizing gas velocities should be selected so as to maintain the bed in a state of minimum fluidization up to the smooth fluidization state. More preferably the fluid bed is in the smooth fluidization state.

The duration of the stabilization step depends on the coating and the selected temperature. Generally, for polymer coatings, stabilization will last between about 0.5 to about 20 minutes, preferably, between about 1 to about 10 minutes, more preferably, between about 2 to about 8 minutes, and more preferably still, between about 2 to about 5 minutes.

Further processing parameters, such as post-stabilization temperatures and cooling times, will depend on the nature of the substrate to be coated and the nature of the polymer being used as the coating.

The process of the invention may be conducted as a single batch job, or a continuous production. The process of the invention may be conducted in a single piece of equipment or in multiple pieces of equipment. Different combinations can be used, such as a first rotating drum in sequence with a second rotating drum, rotating at different speeds, having different diameters, etc.; a rotating drum in co-operation with a fluid bed; a fluid bed in co-operation with a rotating drum; two fluid beds in co-operation; a single fluid bed having two regions or zones, one for coating the substrate and the other for drying or curing the coated substrate; a single rotating drum which changes its mixing power mid-operation; a single rotating drum having two regions of different diameters; etc.

A preferred apparatus is a single drum, which changes its mixing power mid-operation by adjusting drum structure, such as, baffle structure and baffle angles, by using additional mechanical devices (such as, a rotating mixer in the substrate bed, a comb shaped device dipped into the substrate bed or mixing bars), or by changing speed (e.g., a drum equipped with a variable speed drive).

Devices that improve mixing power in the application step include agitators, combs or mixing bars, or baffles. If a single drum is used having an application and a stabilization zone, different baffle structures can be included in each zone. If different baffle structures are used in each zone, a higher baffle could be used in the application zone than in the stabilization zone, or baffles having a different angle along the axial length of the drum could be used in the application and stabilization zones. If baffles having different angles along the axial length are used in the application and stabilization zones, then the angle should be chosen in the application zone that helps the mixing of the substrate and/or that flips the substrate backwards to increase the mixing power and relative mixing time. Baffles in the application zone may also be used that have a comb or wave structure that improves mixing. Devices may also be chosen for the application zone to minimize coating damage. The stabilization zone may have baffles along the axial length of the drum that help to minimize the disturbance of the coating on the substrate so as to reduce damage to the coating. Baffles in the stabilization zone may be chosen so that the angle and/or shape helps to minimize damage to the coating. If more than one drum is used for the application and stabilization steps, agitators, combs or mixing bars, or baffles can be chosen in accordance with the above principles for each of the application and stabilization steps.

The following examples are offered by way of illustration and not by way of limitation.

EXAMPLE 1

A 1 kg sample of urea was loaded into a 12 inch diameter drum and heated while rotating to 75° C. with an electric heat gun. A mixture of 18% by wt. $C_{30}^+$ wax in castor oil was heated to 115° C. on an electric hotplate. A volume of this mixture equivalent to 6.7 grams and a volume of isocyanate equivalent to 2.3 grams were applied simultaneously to the urea at 75° C. After 6 minutes of rotation a second identical coat was applied. A $3^{rd}$ coat was applied after an additional 6 minutes. 6 Minutes after the $3^{rd}$ coat was applied, the heat source was removed and the sample was air cooled with compressed air. After 12 minutes the sample had cooled below 30° C., the drum rotation was stopped and the sample was removed. The coating weight of the product is 2.7%, based on the weight of the substrate. The results are shown in FIG. 1.

In FIG. 1, the rpm of the drum was adjusted for the different tests by changing the motor speed, with the split rpm the drum (motor) speed was reduced 2 minutes after the coating reactants were applied.

As can be seen by the results shown in FIG. 1, a rapid agitation coating step followed by a slow agitation stabilization step greatly improves the controlled release profile of the fertilizer product produced compared to those produced using a single operating parameter.

The water release profile for the controlled release fertilizer material was determined in accordance with the following procedure.

Water Release Profile Test

A water release rate profile analysis was performed using a Technicon AutoAnalyzer™, calibrated and used pursuant to the teachings of Automated Determination of Urea and Ammoniacal Nitrogen (University of Missouri, 1980). The following procedure was used:
1. Accurately weigh 15 grams (±0.1 mg) of the sample into a weigh dish. Record the weight of sample. Transfer the sample to 125 mL Erlenmeyer flask.
2. Add 75 mL of demineralized water and stopper the flask.
3. Gently swirl the sample and water until all the particles are submersed.
4. Let the sample stand for a specified time at a constant temperature (typically at room temperature).
5. Gently swirl the flask to mix the solution and decant only the solution to a 100 mL volumetric flask.
6. Rinse the sample with demineralized water adding to the volumetric flask.
7. Bulk to volume of volumetric flask and mix thoroughly.
8. If the test is to be repeated for another time period, repeat starting at Step 2.
9. Once the Technicon AutoAnalyzer II is on line, transfer some of this solution (or perform the required dilutions if necessary) to the Technicon sample cups for analysis.
10. Record the results as parts per million N—$NH_3$ (read directly from a Shimadzu Integrator).

The water release profile of controlled release products produced according to the process of the invention is improved over those produced using conventional processes.

EXAMPLE 2

The samples produced in Example 1 (FIG. 1) were subjected to simulated handling damage in the paintshaker test. After the simulated damage test the samples were again analyzed for water release. The effects of the different RPM cases is evident after the simulated damage test. The results are shown in FIG. 2.

Paint Shaker Simulation Test

The "paint shaker simulation" test used to simulate the damage to the controlled release coating is conducted in a paint shaker machine. First 200 grams of the controlled release fertilizer are placed in a 6" diameter by 5.5" deep metal can with a lid. Then 8 (¼ inch by ½ inch) machine bolts with slotted heads and 8 (¼ inch) square head nuts are added in the can. The can with the controlled release fertilizer, nuts, and bolts is then placed securely in a paint conditioner/shaker (Red Devil, ¼, H.P. model). The test sample is vigorously conditioned in the paint shaker at a frequency of 730 cycles per minutes for 6 minutes. The operating time is controlled with an electronic timer (Gralab model 451) that automatically stops the paint shaker at the preset time. After the paint shaker cycling is complete the can is removed and the nuts and bolts are removed by passing the contents through a 3½ mesh screen. The controlled release fertilizer is collected in a pan and returned to its sample bag for the release rate analysis.

Figure 2:
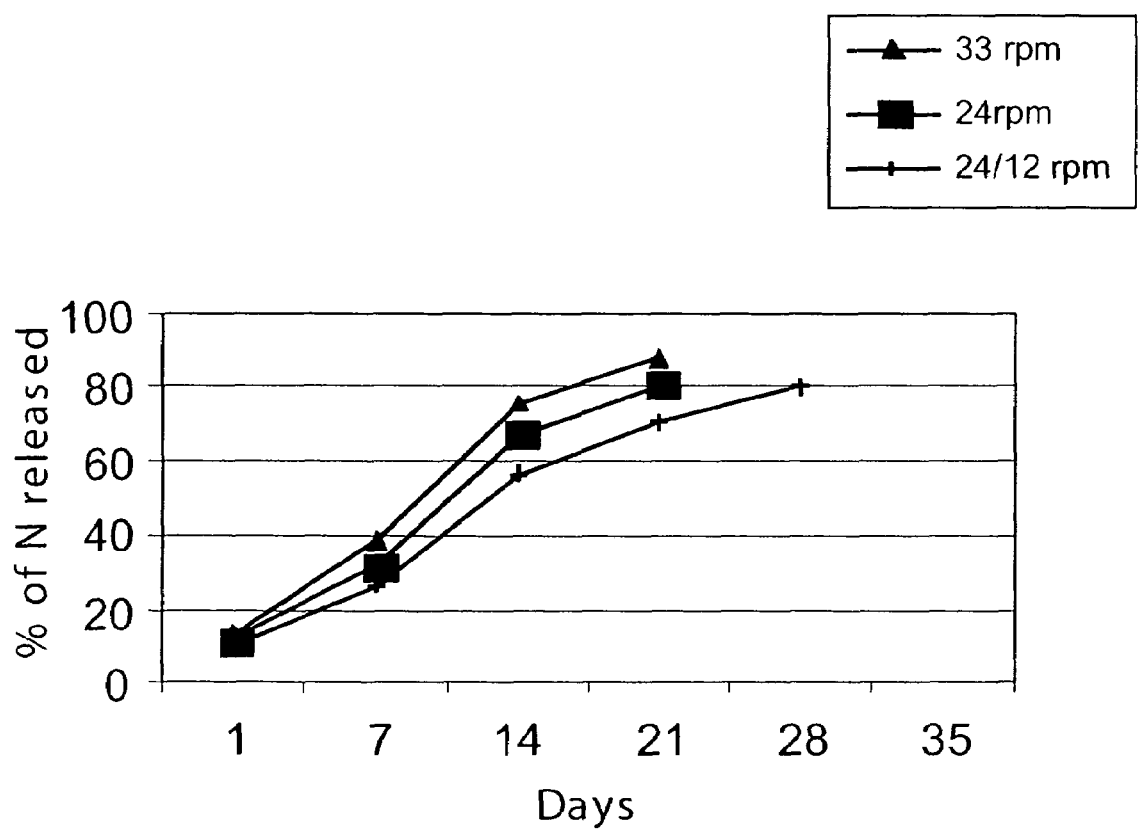
FIG. 2 is a controlled release profile showing the effect of RPM on release rate after a simulated damage test.

As can be seen by the results shown in FIG. 2, even after the simulated damage test, the controlled release profile of the controlled release products produced by the present invention are improved over those produced where a single operating parameter is used.

EXAMPLE 3

In this Example, the effect of ultrasonically pre-mixing the monomers is considered. A 1 kg sample of urea was loaded into a 12 inch diameter drum rotating at 24 rpm and heated while rotating to 75° C. with an electric heat gun. A mixture of 18% by wt. $C_{30}^+$ wax in castor oil was heated to 115° C. on an electric hotplate. A volume of this mixture equivalent to 12.8 grams and a volume of isocyanate equivalent to 5.2 grams were ultrasonically mixed for 30 seconds before 9 grams of the mixture was applied to the rolling bed of urea at 75° C. After 6 minutes of rotation a second identical coat was prepared and applied. A $3^{rd}$ coat was applied after an additional 6 minutes. 6 minutes after the $3^{rd}$ coat was applied, the heat source was removed and the sample was air cooled with compressed air. After 12 minutes the sample had cooled below 30° C., the drum rotation was stopped and the sample was removed. The water release rate profile for the controlled release fertilizer material was then determined.

The release profile of the ultrasonically mixed reactants is compared to that of a similar sample that was produced with the same reactants applied simultaneously to the rolling bed. The results are shown in FIG. 3.

Figure 3:
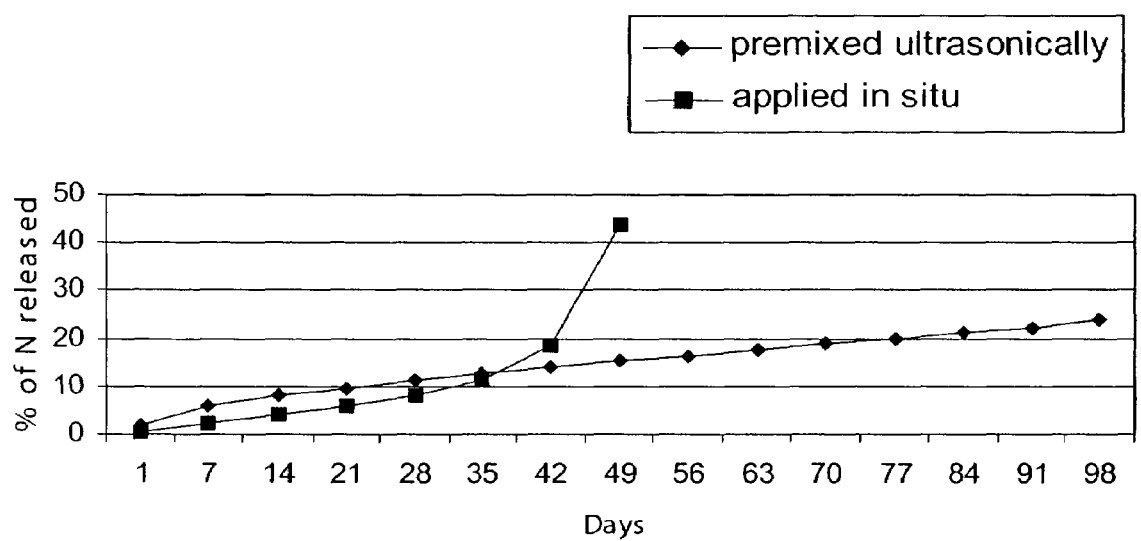
FIG. 3 is a controlled release profile showing the effect of ultrasonic pre-mixing of monomer.

As can be seen by the results shown in FIG. 3, by pre-mixing the monomers, an improved controlled release profile is achieved. This indicates that the ultrasonic mixing improves the evenness of the coating; e.g., the ratio of castor oil over isocyanate. Better mixing not only improves the evenness of the coating thickness on different substrate granules, but also improves the evenness of the chemical composition of the coating on a single granule. Ultrasonic mixing is a mixing extreme. With ultrasonic mixing, the viscosity of the coating materials will increase significantly. Therefore, even though it can improve the evenness of the chemical composition, ultrasonic mixing also increases the difficulty of achieving an even coating thickness, because the viscosity of the coating materials are increased. Thus, if pre-mixed or pre-polymer coating materials are used in the process of the present invention, there is an optimum combination between viscosity and mixing capacity in the application stage.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

All publications, patents and patent applications cited in this specification are incorporated herein by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

It must be noted that as used in the specification and the appended claims, the singular forms of "a", "and" "the" include plural reference unless the context clearly indicates otherwise. Unless defined otherwise all technical and scientific terms used herein have the same meaning as commonly understood to one of ordinary skill and the art to which this invention belongs.

The invention claimed is:

1. A process for producing a coated product in a rotating drum, the process comprising the steps of:
   a) coating a substrate with a coating material in a coating zone of the rotating drum rotating at a first circumferential drum speed to form a coated substrate; and
   b) stabilizing the coated substrate in a stabilization zone of the rotating drum rotating at a second circumferential speed to form the coated product;
   wherein the first circumferential drum speed is sustained in the range of from about 14 meter per minute to about 40 meter per minute and the second circumferential drum speed is sustained in the range of from about 10% to about 80% of the first circumferential drum speed for a duration of between about 0.5 minutes to about 20 minutes.

2. The process of claim 1, wherein the substrate is a plant nutrient, drug or vitamin.

3. The process of claim 1, wherein the substrate is urea.

4. The process of claim 1, wherein the coating material is a polymer.

5. The process of claim 1, wherein the coating material is a thermoset polymer.

6. The process of claim 1, wherein the coating material is a polyurethane.

7. The process of claim 6, wherein the polyurethane is a reaction product of a polyol or a mixture of polyols and an isocyanate or a mixture of isocyanates.

8. The process of claim 7, wherein the polyol and isocyanate are applied sequentially or simultaneously.

9. The process of claim 8, wherein the polyol and isocyanate are applied simultaneously and are ultrasonically pre-mixed.

10. The process of claim 6, where the coating material further comprises one or more coating additives.

11. The process of claim 10, wherein the coating additive comprises a hydrophobic material.

12. The process of claim 10, wherein the coating additive comprises a wax.

13. The process of claim 1, wherein step a) and step b) are conducted in different rotating drums.

14. The process of claim 1, wherein the second circumferential drum speed is in the range of from about 20% to about 80% of the first circumferential drum speed.

15. The process of claim 1, wherein step a) and step b) are conducted in different rotating drums having different diameters characterized in that the diameter of the drum for step b) is smaller than for step a).

16. The process of claim 15, wherein the diameter of the drum for step b) is about 10 to about 80% smaller than for step a).

17. The process of claim 1, wherein step a) and step b) are conducted in a single rotating drum, having a first zone and a second zone characterized in that the first zone has a larger diameter than the second zone.

18. The process of claim 17, wherein the diameter of the drum in the first zone is about 10% to about 80% larger than in the second zone.

19. The process of claim 1, wherein step a) and step b) are conducted in a single rotating drum which changes its mixing power between step a) and step b) by reducing its speed and by a different internal drum structure in the coating zone and the stabilization zone.

20. The process of claim 1, wherein the second circumferential drum speed is in the range of from about 30% to about 80% of the first circumferential drum speed.

21. The process of claim 1, wherein the second circumferential drum speed is in the range of from about 40% to about 80% of the first circumferential drum speed.

22. The process of claim 1, wherein the first circumferential drum speed is in the range of from about 20 to about 30 meter per minute.

23. The process of claim 1, wherein step b) is conducted for a duration of between about 1 to about 10 minutes.

24. The process of claim 1, wherein step b) is conducted for a duration of between about 2 to about 8 minutes.

25. The process of claim 1, wherein step b) is conducted for a duration of between about 2 to about 5 minutes.

* * * * *